United States Patent
Strachota et al.

(10) Patent No.: US 9,798,522 B2
(45) Date of Patent: Oct. 24, 2017

(54) GENERATING COMMAND LINE INTERFACE USING APPLICATION PROGRAMMING INTERFACE SPECIFICATION

(71) Applicant: Red Hat, Inc., Raleigh, NC (US)

(72) Inventors: Tomáš Strachota, Zlín (CZ); Martin Bačovský, Lysice (CZ)

(73) Assignee: Red Hat, Inc., Raleigh, NC (US)

( * ) Notice: Subject to any disclaimer, the term of this patent is extended or adjusted under 35 U.S.C. 154(b) by 21 days.

(21) Appl. No.: 14/622,588

(22) Filed: Feb. 13, 2015

(65) Prior Publication Data
US 2016/0239274 A1    Aug. 18, 2016

(51) Int. Cl.
*G06F 9/44*    (2006.01)

(52) U.S. Cl.
CPC . *G06F 8/10* (2013.01); *G06F 8/30* (2013.01)

(58) Field of Classification Search
CPC ................. G06F 8/10; G06F 8/38; G06F 8/30
USPC ........................................................ 717/106
See application file for complete search history.

(56) References Cited

U.S. PATENT DOCUMENTS

| | | | |
|---|---|---|---|
| 7,039,724 B1 * | 5/2006 | Lavian ................ | H04L 41/0213 707/999.001 |
| 7,111,206 B1 * | 9/2006 | Shafer ................. | H04L 41/0266 714/20 |
| 7,210,120 B2 * | 4/2007 | Reyna ................. | G06F 9/45512 714/2 |
| 7,363,351 B1 * | 4/2008 | Shafer ................. | H04L 45/56 707/999.002 |
| 7,562,369 B1 * | 7/2009 | Salamone ................ | G06F 9/54 719/328 |
| 7,831,955 B2 * | 11/2010 | Tamura .................. | G06F 9/545 717/100 |
| 7,895,234 B2 * | 2/2011 | Lillie ................ | G06F 17/30873 707/784 |
| 8,255,932 B1 * | 8/2012 | Clemm .................... | G06F 8/54 709/230 |
| 8,838,858 B1 * | 9/2014 | Wu ........................ | G06F 5/00 710/11 |
| 9,218,269 B2 * | 12/2015 | Dolinina ............. | G06F 11/3672 |
| 2005/0229152 A1 * | 10/2005 | Connell ................... | G06F 8/10 717/104 |

(Continued)

OTHER PUBLICATIONS

Strachota, Hammer—the CLI tool (not only) for Foreman, GitHub (Nov. 12, 2013) retrieved from https://github.com/theforeman/hammer-cli/blob/3dc470eb5cc3fc71f35cd9c6b    130ed71730690f1/ README.md on Feb. 21, 2016.*

(Continued)

*Primary Examiner* — Lewis A Bullock, Jr.
*Assistant Examiner* — Theodore Hebert
(74) *Attorney, Agent, or Firm* — Lowenstein Sandler LLP

(57) ABSTRACT

A system and method for generating a command line interface (CLI) in view of an application programming interface (API) specification is disclosed. An instance of a CLI may be initialized. Responsive to the initializing, the system or method may request an application programming interface (API) specification for a software application installed on a server system. The system or method may receive the API specification for the software application. The system and method, in view of the API specification may create a command definition of the CLI.

19 Claims, 7 Drawing Sheets

(56) References Cited

U.S. PATENT DOCUMENTS

| | | | | |
|---|---|---|---|---|
| 2006/0200808 | A1* | 9/2006 | Kalidindi | G06F 8/51 717/136 |
| 2010/0162205 | A1* | 6/2010 | Clemm | H04L 41/0213 717/106 |
| 2013/0290694 | A1* | 10/2013 | Civilini | H04L 41/28 713/2 |
| 2015/0172117 | A1* | 6/2015 | Dolinsky | H04L 41/0893 709/221 |
| 2015/0324217 | A1* | 11/2015 | Shilmover | G06F 9/45558 718/1 |

OTHER PUBLICATIONS

Bacovsky, Foreman API bindings for Ruby, GitHub (Oct. 31, 2013) retrieved from https://github.com/mbacovsky/foreman_api on Feb. 21, 2016.*

Strachota, Creating commands fro RESTful API with ApiPie, GitHub (Nov. 12, 2013) retrieved from https://github.com/theforeman/hammer-cli/blob/d44eee4511d9b40c542512ac876c566abe210d7b/doc/creating_apipie_commands.md on Feb. 21, 2016.*

Beacon IP Report; Dec. 29, 2014; 6 pgs.

Foreman CLI-design proposal the Ruby way; Martin Bacovsky; May 3, 2013; https://www.redhat.com/archives/katello-devel/2013-May/msg00011.html; 4 pgs.

What is Foreman?; github/theforeman/theforeman.org, 2 pages, downloaded from https://github.com/theforeman/theforeman.org on Dec. 29, 2014.

Foreman 1.5 Manual; github/theforeman/theforeman.org, released May 2014, 95 pages, downloaded from https://github.com/theforeman/theforeman.org on Dec. 29, 2014.

Strachota, Thomas, "Foreman deep dive: Dynamically generated CLI," YouTube video presentation, Feb. 13, 2014, 36 pages, screen shots and transcription of audio; download at https://www.youtube.com/watch?v=gbHxt9W-Bh4.

* cited by examiner

GENERATING COMMAND LINE INTERFACE USING APPLICATION PROGRAMMING INTERFACE SPECIFICATION

TECHNICAL FIELD

Aspects of the disclosure generally relate to command line interfaces and, more specifically, relate to the generation of command line interfaces in view of an application programming interface (API) specification associated with a software application.

BACKGROUND

An application programming interface (API) may be used to exchange data between a server system (e.g., first computer system) and a client system (e.g., second computer system). The API of a software application installed on a server system may comprise a plurality of API methods that may be used to access server resources. For example, the client system may exchange data with the server system by transmitting a request to perform an API method. The request may identify the API method to be performed and may optionally comprise one or more API parameters.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
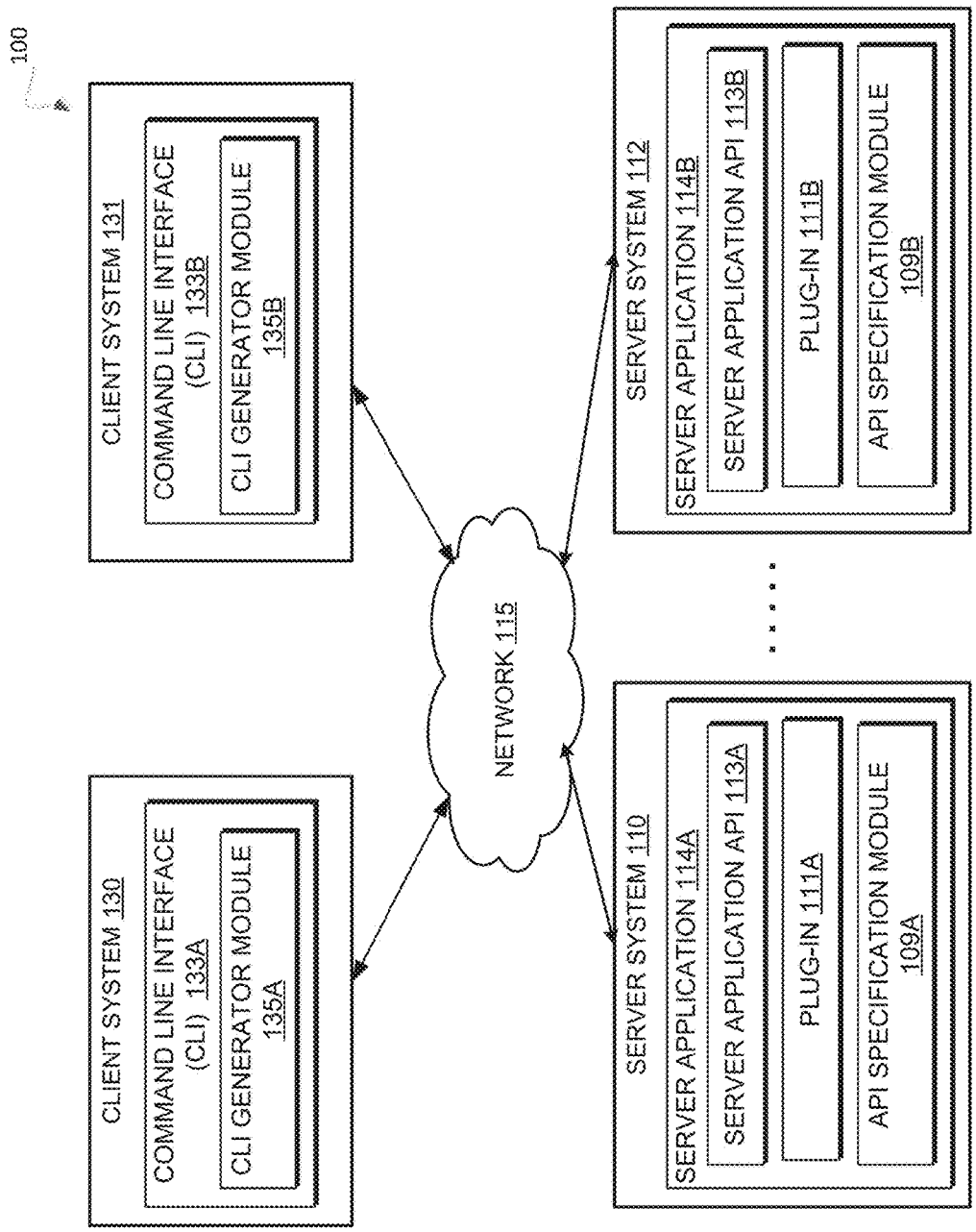
FIG. 1 illustrates an example system architecture in which implementations of the disclosure may operate.

A client system may employ a command line interface (CLI) for interacting with a software application running on a server computer system. The CLI may use commands that invoke the API methods and provide the necessary API parameters used by the software application. If the API of the software application changes (e.g., due to a configuration change in the software application or a version upgrade of the software application), the CLI of the client system may need to be synchronized with the updated API.

Updating the client CLI may require significant efforts by developers and a corresponding management overhead. Additionally, two servers of a server system may be running different versions of a software application requiring the maintenance of two versions of the CLI on a client system. The present disclosure addresses the above-mentioned and other deficiencies by generating a CLI, in view of a current API specification, as part of the initialization process of a CLI instance on a client computer system.

The API specification of a software application may include formalized definitions of API resources, API methods, and/or API parameters thus enabling another software application to interact or interface with the software application. An API resource definition may include an API resource identifier, an API resource type, relationship data (e.g., relationship to other API resources and API methods, including references to one or more methods that operate on the resource), and any additional information to allow another software application to use an API resource to interact or interface with the software application. An API method definition may include an API method identifier, relationship data (including references to the API resource and), API parameter definitions, and any additional information to allow another software application to use an API method to interact or interface with the software application. An API method may be a sequence of program instructions that perform a particular function. An API parameter definition may include an API parameter, relationship data (e.g., relationship with an API method), and any additional information to allow another software application to use an API parameter to interact or interface with the software application. An API parameter may be a value of the function defined by an API method. In various illustrative examples, an API specification for a given software application may be generated by the software application itself, by another software application, or by a user.

A CLI may be viewed as a middle-layer used to interact with or control a software application. A CLI may use a command to produce a request to perform an identified function (e.g., API method) to be executed on a specified resource (e.g., API resource) with the specified values of one or more parameters (e.g., API parameters). A command definition may comprise a mapping of a command to an API resource, an API method, and/or an API parameter so that when the command is invoked at the CLI, the CLI requests the server to execute the corresponding API method. A command instance may be a string of text used to identify a corresponding command.

In one implementation, a CLI may be initialized by for example, a user, a software program, or an operating system. In response to the initialization, the API specification of a software program installed on a server system may be requested and received. The API specification may be parsed to identify one or more API resources. For each API resource, a resource definition may be defined by generating a corresponding fragment of the script or other executable module that implements the CLI (i.e., CLI script). The API specification may be further parsed to identify API methods that may be performed on each API resource. For each API method associated with an API resource, a command definition may be created by generating another corresponding fragment of the CLI script to map the command to the API method. For each API parameter, the command definition may be enhanced by generating another corresponding fragment of the CLI script to supply the one or more API parameters to the server system when the API method is invoked.

FIG. 1 illustrates an example system architecture 100 in accordance with some implementations of the disclosure. System architecture 100 may include server system 110 and server system 112 coupled to client system 130 and client system 131 over a network 115. Each of the client system 130 and/or 131 may connect to the server system 110 and/or 112 via the network 115. Although two client systems (e.g., client system 130 and/or 131) are illustrated in FIG. 1, any number of client systems may be present in system architecture 100. Although two server systems are illustrated (sever system 110 and/or 112) in FIG. 1, any number of server systems may be present in system architecture 100. The client system 130 and/or 131 and server system 110 and/or 112 may be a computing device such as server computer, a desktop computer, or a laptop computer, or a portable computing device such as, but not limited to, mobile telephones, personal digital assistants (PDAs), portable media players, netbooks, tablet computers, portable gaming consoles, portable televisions, electronic book readers, and the like. The network 115 may be a private network (e.g., a local area network (LAN), a wide area network (WAN), intranet, etc.), a public network, a wireless network, a cellular network, or a combination thereof.

The server system 110 and/or 112 may be a server computer that is part of an online infrastructure system. Examples of an online infrastructure include a cloud computing platform that may allow multiple users from multiple client systems (e.g., client system 130 and/or 131) to access different components or computer resources of the cloud computing platform. The online infrastructure may provide physical or virtual resources, such as access to services, servers, or other such resources, to client systems. Examples of services (or functionality) provided by the online infrastructure may include, but are not limited to, access to data stored on storage devices, provisioning of virtual machines, software services, physical servers, etc.

Server system 110 and 112 may include server application 114A and 114B, respectively. An application (e.g., software application) may be one or more related processes to be executed by one or more servers in order to deliver certain functionality. Server application 114A and/or 114B may be any software application. Sever application 114A and/or 114B may be distributed across multiple server systems, as illustrated in FIG. 1. Alternatively, the server application 114A and/or 114B may be installed on a single server system. In the following description reference will be made to server application 114A server application API 113A, plug-in 111A, API specification module 109A, CLI 133A, CLI generator module 135A, server system 110, and client system 130. It should be noted that references to server application 114A server application API 113A, plug-in 111A, API specification module 109A, CLI 133A, CLI generator module 135A, server system 110, and client system 130 are made for purposes of convenience and are not intended to be limiting. Server application 114B server application API 113B, plug-in 111N, API specification module 109B, CLI 133B, CLI generator module 135B, server system 112, and client system 131 may be used in conjunction with and/or have the same functionality as server application 114A server application API 113A, plug-in 111A, API specification module 109A, CLI 133A, CLI generator module 135A, server system 110, and client system 130, respectively, unless otherwise noted.

Sever application 114A includes a server application API 113A. Server application API 113A may be the API for server application 114A. An API, such as server application API 113A, may enable the exchange of data between server system 110 and client system 130 as well as allow client system 130 to access certain server system resources of server system 110.

Client system 130 may transmit to server system 110 a request that identifies an API method and provides one or more values for one or more of the API parameters as defined by the API specification of the server application 114A. In response to the request, the server application API 113A of the server system 110 may execute the API method using the values for one or more API parameters and may transmit a response to client system 130. For example, an API method "list" may be used to return a user list. The available API parameters of the API method "list" may be time, location, and type. The client system 130 may identify the "list" API method, using a respective command, and provide a value of "location=Czech Republic" for the location API parameter and transmit an identifier of the "list" API method and the "location=Czech Republic" value for the location API parameter to the server system 110. The server system 110 may then execute the "list" API method using the value of the location API parameter. The server system 110 may then return to the client system 130 response data comprising a list of users who are associated with the location of the Czech Republic.

In one implementation, server application API 113A may be a representational state transfer (REST) API. REST may be an architectural style including guidelines and best practices used to create scalable web services. Systems implementing REST (e.g., RESTful systems) may communicate using the Hypertext Transfer Protocol (HTTP). REST APIs may comprise definitions of API resources, API methods associated with each API resources, and the respective API parameters of the API methods. For example, an API resource (e.g., architecture, user) may have one or more associated API methods (e.g., index—for listing records, show—for reading details about a record, create—for creating new records and associated them with other records, update—for updating the record fields and associations, and delete—for removing records). A uniform resource identifier (URI) may be used to identify the name of an API resource. All references to REST API herein are illustrative examples and are not intended to limit implementations of the present disclosure to REST APIs.

When the API of the software application changes (e.g., due to a configuration change in the software application or version upgrade of the software application, the CLI of the client system 130), CLI 133A of the client system 130 may need to be synchronized with the updated API. For example, server application 114A may have a plug-in installed, such as plug-in 111A. A plug-in may be an extension to an existing software application (e.g., server application 114A) that changes or adds specific features to the software application. When the plug-in 111A is installed on server system 110, CLI 133A may need to be synchronized with an updated API.

In one implementation, server system 110 may each include an API specification module 109A that may be used to create an API specification for the server application 114A currently installed on the corresponding server. Alternatively, server application 114A may not include API specification module 109A, and the API specification for server application API 113A may be produced by server application 114A, another software application, or a user. The API specification may be received by server system 110 via a communication interface, such as a network interface or a graphical user interface (GUI).

In one implementation, the API specification module 109A may create a first API specification to identify a first API being used by the server system 110. If server application 114A is changed API specification module 109A may create an updated API description.

The API specification may include a definition of API resources (for REST APIs), API methods, and API parameters used by the server application API 113A of the server system 110. An example API specification for the API resource "user" is represented below:

```
User
desc: Manage system users
actions:
    show
        desc: Details about a user
        params:
            id, Reference<self>, desc: User's identifier
    index
        desc: List users
        fields:
            user/id, Id
            user/login, Login
            user/created_at, Created, format_as Timestamp
    create
        desc: Create new user
        params:
            login, String, desc: New login for the user
            email, String, desc: Email address
            organization_id, Reference<Organization>, desc:
            ID of the organization the user belongs to.
        messages:
            success: User successfully created with id [%{id}]
            failure: Could not create the user
    update
        desc: Update details of an existing user
        params:
            email, String, desc: Email address
            organization_id, Reference<Organization>, desc:
            ID of the organization the user belongs to
```

In one implementation, the definitions in the API specification may include the names and description for at least one of an API resource, API method, and API parameter. In the above example API specification, the API description is for the API resource, "user." The names of API methods associated with "user" are "show," "index," "create," and "update." API method "create" has the description "Create new user" and has listed API parameters "login," "email," and "organization_id." The API parameters have descriptions such as "New login for the user," which is associated with the API parameter "login." Parameters may also have defined data types, such as integer, Boolean, string, among others. For example, API parameters "login" and "email" have the data type, string, as illustrated in the above example API specification. An API parameter in the API specification may also include a foreign key. A foreign key may be a field (or collection of fields) in one table that uniquely identifies a row of another table in a database. For example in the above example API specification, API parameter "organization_id" is associated with the foreign key "Reference <Organization>."

The API specification may also include metadata. For example, the above example API specification includes metadata "success: User successfully created with the id [%{id}]" and "failure: Could not create user." The aforementioned metadata is associated with the API action, "create." The metadata may be used to create a message to be displayed on a client system if a user enters a command (e.g., action command) that invokes the API action "create." For example, if a new user account is successfully created by server application 114A using CLI 133A, the message, "User successfully created with id [2]" may be displayed on the client system 130. If a new user account is unsuccessfully created by server application 114A using the CLI 133A, the message, "Could not create the user" may be displayed on the client system 130. In another example, API specification in the above example API specification includes the metadata "fields: user/id. ID, user/login. Login, user/created_at, Created, format_as Timestamp." The aforementioned metadata may be used to format the data associated the API method "index" to be displayed on client system 130 in response to user entering the respective command invoking the API method "index" in a CLI 133A. For example, the data (e.g., parameters and value for the parameters) associated with API method "index" may be displayed at the client system 130A as illustrated in the below table:

```
Id | Login | Created
--------------------------------------
1 | jdoe | Sun 18. January 2015
2 | tstracho | Mon 19. January 2015
```

Client system 130 may include command line interface (CLI) 133A. CLI 133A may be used in, for example, a user-software interaction (e.g., interface), by script files in batch processing, or by another software application to communicate with server application 114A. CLI 133A may have one or user interfaces displayed on client system 130. In one implementation, the user interface may be a command line interface 133A, as discussed above. In another implementation, the user interface may be a graphical user interface (GUI). The GUI may provide an interface that includes tools, such as windows, menus, buttons, scrollbars, images, icons, and others, used to interact with server application 114A.

In a client-server system, CLI 133A may run on a different machine than the server application 114A. In one example, CLI 133A may reside on a client system 130A and use commands to effectuate methods to be performed by a server application 114A residing on a server system 110. In another computer system, the CLI 133A may run on the same machine as the server application 114A.

CLI 133A may include CLI generator module 135A. Alternatively, CLI generator module may be a separate software application. CLI generator module 135A may generate CLI 133A using the API specification of server application API 113A. CLI generator module 135A will be discussed in more detail below. It should be noted that CLI generator module 135A described below may describe a series of operations in order to help illustrate features. However, CLI generator module 135A may perform the operations in any order and/or may perform some or all of the operations.

CLI 133A may be initialized on client system 130. A user, another software program, or an operating system may initialize CLI for example, at start-up or when a user initiates initialization. Initialization may be the process of locating and using the defined values for variable data that is used by a CLI.

In response to the initialization, CLI generator module 135A may request the API specification for a software application (e.g., server application 114A) installed on server system 110. In one example, CLI generator module 135A may send a request to server system 110 containing an API method to retrieve the API specification. In another example, CLI generator module 135A may send a request to another software program or request a user for the API specification.

In response to the request, CLI generator module 135A may receive an API specification for the software application (e.g., server application 114A) installed on the server system 110. CLI generator module 135A may receive the API specification for server application 114A from server system 110. Alternatively, CLI generator module 135A may receive the API specification from a data store, another client system, another software program, or another location where the API specification is stored. In another implementation, if the API specification has not changed since the last initialization of CLI 133A, CLI generator module 135A may retrieve the specification from cache memory. In one embodiment, CLI generator module 135A may generate a checksum or hash value or determine the version number of the API specification stored in cache memory with a checksum or hash value or version number received from server system 110 for the API specification for server application 114A. CLI generator module 135A may send an API request to server system 110 requesting the checksum or hash value or version number for the API specification for server application 114A.

The API specification may be received by CLI generator module 135A. In another implementation, the API specification may be received in a data exchange format, such as Java Script Object Notation (JSON), YAML Ain't Markup Language (YAML), Extensible Markup Language (XML), or Hyper Text Markup Language HTML. The type of data exchange format may be selected using a corresponding request or selected by an administrator.

CLI generator module 135A may create a command definition of CLI 133A in view of the API specification received. CLI generator module 135A may parse the API specification to identify one or more API resources. If an API resource is located, CLI generator module 135A may for each API resource define a resource definition by creating first corresponding script fragment of a CLI script. The script fragment may cause the name and description of the resource of CLI 133A to be set to the corresponding name and description of the API resource described in the API specification. The script fragment may also cause CLI generator module 135A to set the resource of the CLI to list all the associated commands when called. The script fragment may also cause CLI generator module 135A to map the resource identifier to the API resource identifier (e.g., to map the resource to the API resource). For example, the corresponding script fragment may cause the resource name to be set to "user" and the description set to "Manage system users" and set the associated commands to "index" and "list" based on the API specification. If resource instance "user" is entered in CLI 133A, CLI 133A may display "index" and "list." It should be noted that CLI generator module 135A may define the command definitions (as described below) prior to associating the commands with a resource.

The API specification may be further parsed to identify one or more API methods associated with the API resource. For each identified API method, CLI generator module 135A may create a command definition by generating and additional fragment of the CLI script to map a command to an API method. The additional fragment of the CLI script to map a command to an API method may cause CLI generator module 135A to create a mapping of the command identifier to the API method identifier (e.g., to map the command to the API method). If the command name is set, the additional fragment of CLI script may cause CLI generator module 135A to set the description of the command to the description of the corresponding API method. For example, the command "info" corresponding to the API method name "show" may be described as "Details about the user," as referred in the above example API specification.

If the API method has corresponding API parameters described in the API specification, the CLI generator module 135A may further modify the command definition by generating another corresponding fragment of the CLI script to supply the API parameters to server system 110 when the API method is invoked. The fragment of CLI script may cause CLI generator module 135A to set the name of the parameter to the name of the corresponding API parameter. The fragment of CLI script may also cause CLI generator module 135A to set the description of the parameter to the description provided by the API specification. The fragment of CLI script may also CLI generator module 135A to set (e.g., map) the parameter identifier to the corresponding API parameter identifier (e.g., to map the parameter to the API parameter). The fragment of CLI script may also cause CLI generator module 135A to set the data type of the parameter according to the data type supplied by the API specification. The fragment of CLI script may also cause CLI generator module 135A to add the parameter to an associated command.

In another implementation, CLI generator module 135A may parse the API specification to identify metadata. For the metadata, CLI generator module 135A may generate an additional fragment of CLI script. The fragment of CLI script may cause CLI generator module 135A to associate the metadata described in the API specification with the respective command and/or parameter of CLI 133A. If the metadata is associated with an API method the metadata may specify a message to be associated with an API method or a format for displaying data associated with the API method (e.g., another type of message).

At CLI runtime if the generated fragments of the CLI are executed, CLI 133A may receive a command instance at CLI 133A. The command instance may be input by a user or input by another software program. CLI 133A may parse the input (e.g., string of characters) to identify a command and/or command definition. CLI 133A may use the input to search for commands that match the input. If a command is found, CLI 133A may execute the command definition to produce a request to perform the API method on a specified API resource and optionally use one or more API parameters. The request may cause server application 114A to execute the API method. CLI 133A may receive and transmit data with the server system 110 using the request identifying the API method, API resource, and/or API parameter.

In one implementation, CLI 133A may send a request identifying an API method to be performed and specifying one or more API parameter associated with the API method to the server application 114A. For example, a CLI command may be invoked causing CLI 133A to send a request to server application 114A. The server application 114A may check the API parameter and send a response status code. The response status code may include a status code indicator indicating the status of the API parameter (valid, invalid, etc.) and/or data (e.g., a message, and or parameter values) associated with the API method. CLI 133A may evaluate the response status code and cause at least one of a message associated with the respective API method or a format (e.g., message) for displaying data associated with the API method to be displayed on client system 130. The message and format may be indicated by the metadata in the API specification.

Figure 2:
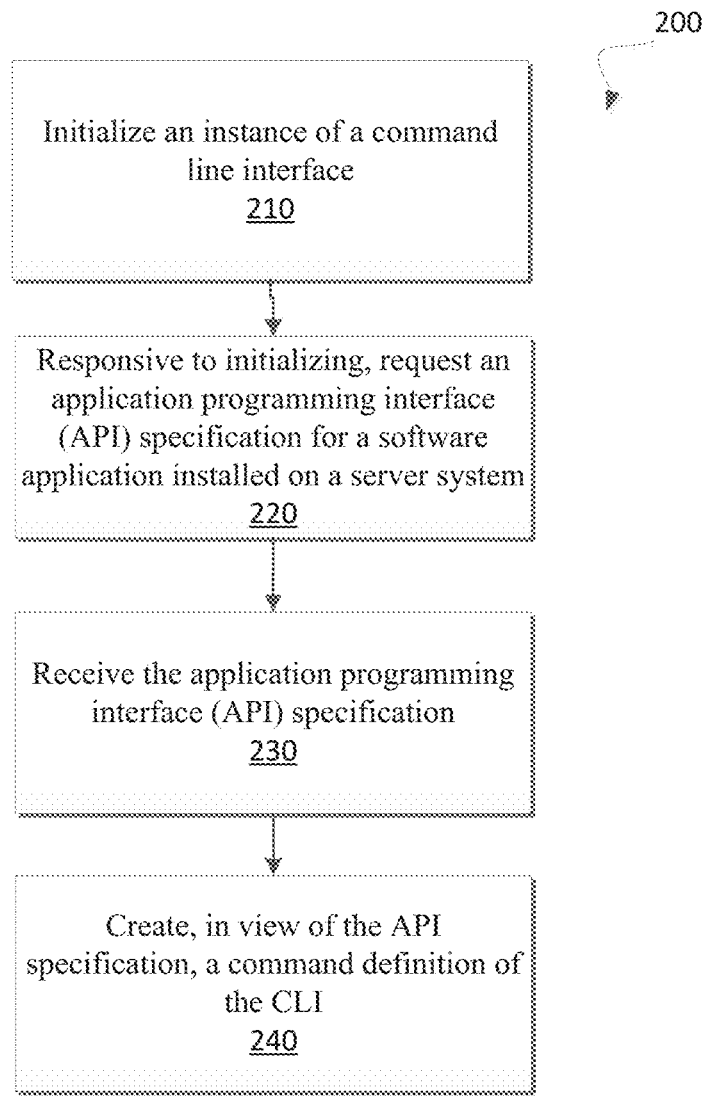
FIG. 2 is flow diagram of an example method for generating a command line interface at a client system in view of an API specification of a software application in accordance with some implementations.

FIG. 2 is flow diagram of an example method for generating a command line interface at a client system in view of an API specification of a software application. The method 200 may be performed by processing logic that may comprise hardware (e.g., processing device, circuitry, dedicated logic, programmable logic, microcode, etc.), software (e.g., instructions run or executed on a processing device), or a combination thereof. The method 200 may be performed by a CLI generator module 135A of client system 130.

As shown in FIG. 2, the method 200 may begin at block 210 where processing logic executing the method may initialize an instance of the command line interface 133A on client system 130. In one example, a user may initialize CLI 133A by entering a command to initialize CLI 133A.

Method 200 continues to block 220 where processing logic responsive to the initializing, requests an API specification for a software application installed on a server system 110. Method 200 continues to block 220 where processing logic may receive an API specification for the server application 114A installed on server system 110. Method 200 continues to block 240 where processing logic creates a command definition in view of the API specification. Additional details of method 200 are described in reference to FIGS. 1, and 4.

Figure 3:
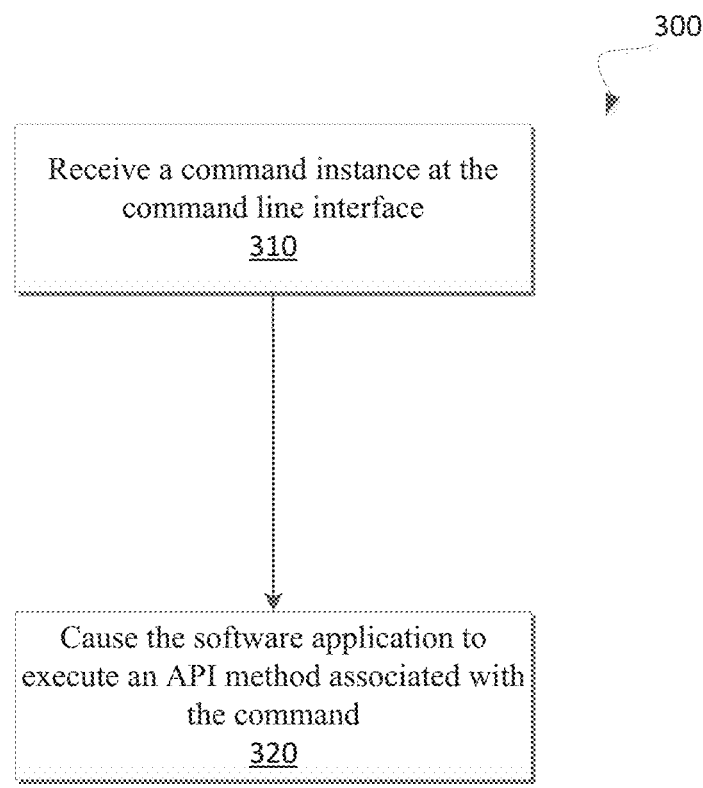
FIG. 3 is flow diagram of an example method for implementing a command line interface generated in view of an API specification of a software application in accordance with some implementations of the disclosure.

FIG. 3 is flow diagram of an example method for implementing a command line interface generated in view of an API specification of a software application in accordance with some implementations of the disclosure. The method 300 may be performed by processing logic that may comprise hardware (e.g., processing device, circuitry, dedicated logic, programmable logic, microcode, etc.), software (e.g., instructions run or executed on a processing device), or a combination thereof. The method 350 may be performed by, in part of wholly, by CLI 133A of client system 130.

As shown in FIG. 3, the method 300 may begin at block 310 where processing logic executing the method may receive a command instance from the command line interface. The method continues at block 320 where processing logic causes server application 114A to execute an API method associated with the command. Method 300 is further described in reference to FIG. 1.

Figure 4:
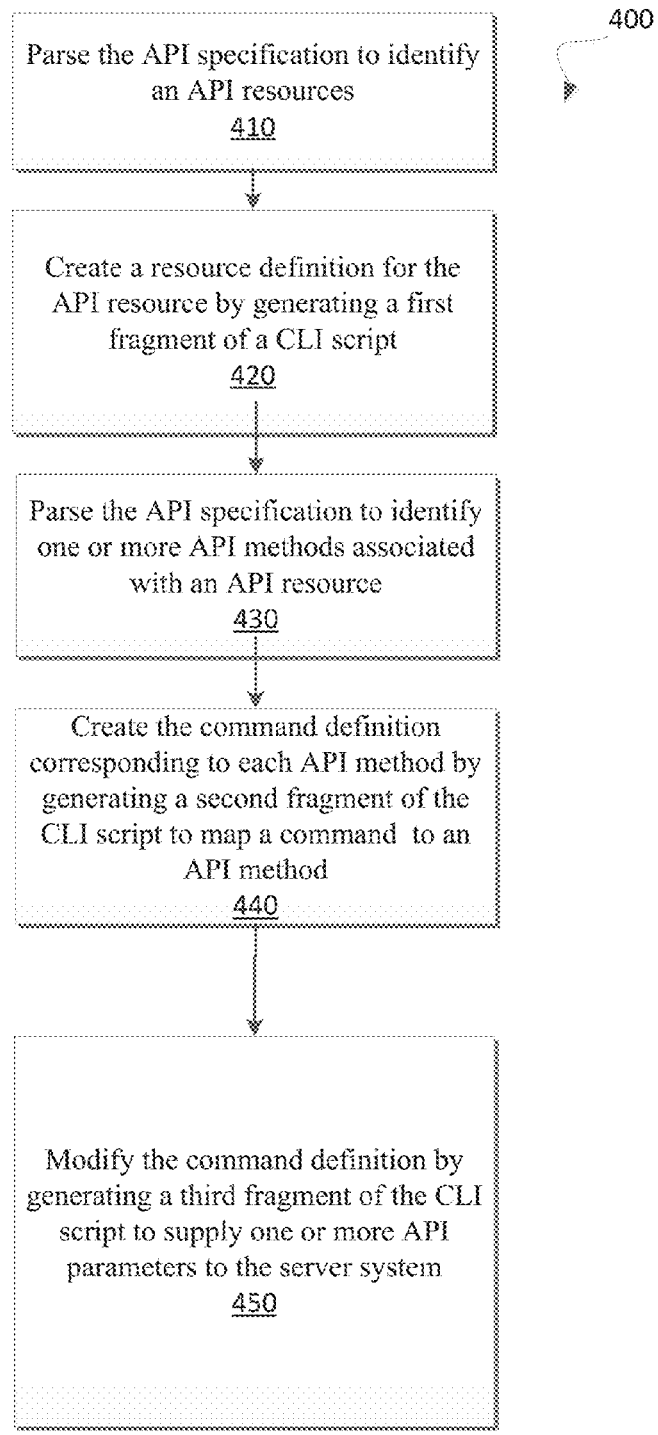
FIG. 4 is a flow diagram of an example method for creating a command definition of the CLI in view of the API specification in accordance with some implementations.

FIG. 4 is a flow diagram of an example method for creating a command definition of the CLI in view of the API specification in accordance with some implementations. The method 400 may be performed by processing logic that may comprise hardware (e.g., processing device, circuitry, dedicated logic, programmable logic, microcode, etc.), software (e.g., instructions run or executed on a processing device), or a combination thereof. The method 400 may be performed by CLI generator module 135A of client system 130.

The method 400 may begin at block 410 where processing logic executing the method parses the API specification to identify one or more API resources. Method 400 continues to block 420 where processing logic for each of the one or more API resources, creates a resource definition for the API resources by generating a first fragment of a CLI script. Method 400 continues in block 430 where processing logic may parse the API specification to identify one or more API methods associated with an API resource. Method 400 continues in block 440 where processing logic for each API method, creates the command definition corresponding to each API method by generating a second fragment of the CLI script to map a command to an API method. Method 400 continues in block 450 where processing logic determines if the API method has corresponding API parameters. If the API method has corresponding parameters, processing logic modifies the command definition by generating another fragment of the CLI script to supply one or more API parameters to the server system when the API method is invoked. Method 400 is further described in reference to FIG. 1.

Figure 5:
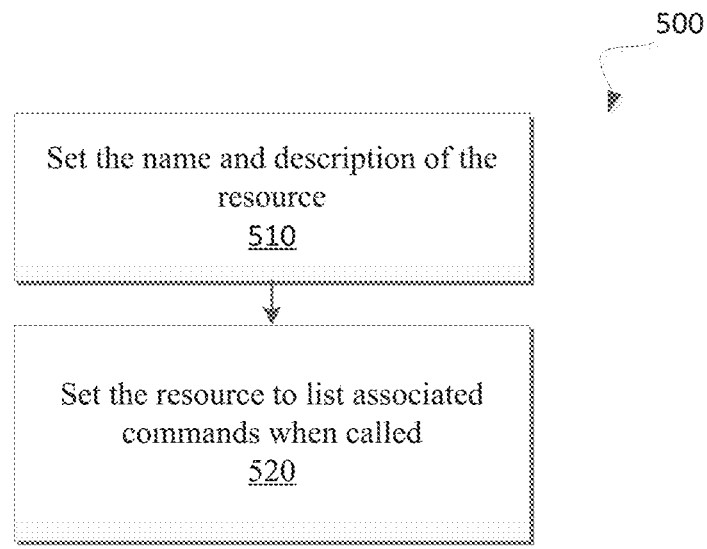
FIG. 5 is a flow diagram of an example method for creating a resource definition in view of the API specification in accordance with some implementations.

FIG. 5 is a flow diagram of an example method for creating a resource definition in view of the API specification in accordance with some implementations. The method 500 may be performed by processing logic that may comprise hardware (e.g., processing device, circuitry, dedicated logic, programmable logic, microcode, etc.), software (e.g., instructions run or executed on a processing device), or a combination thereof. The method 500 may be performed by CLI generator module 135A of client system 130.

Method 500 may begin at block 510 where processing logic executing the method may set the name and description of the resource in view of the API specification. Method 500 continues to block 520, where processing logic may set the resource to list associated commands when called by CLI 133A. Method 500 is further described in reference to FIG. 1.

Figure 6:
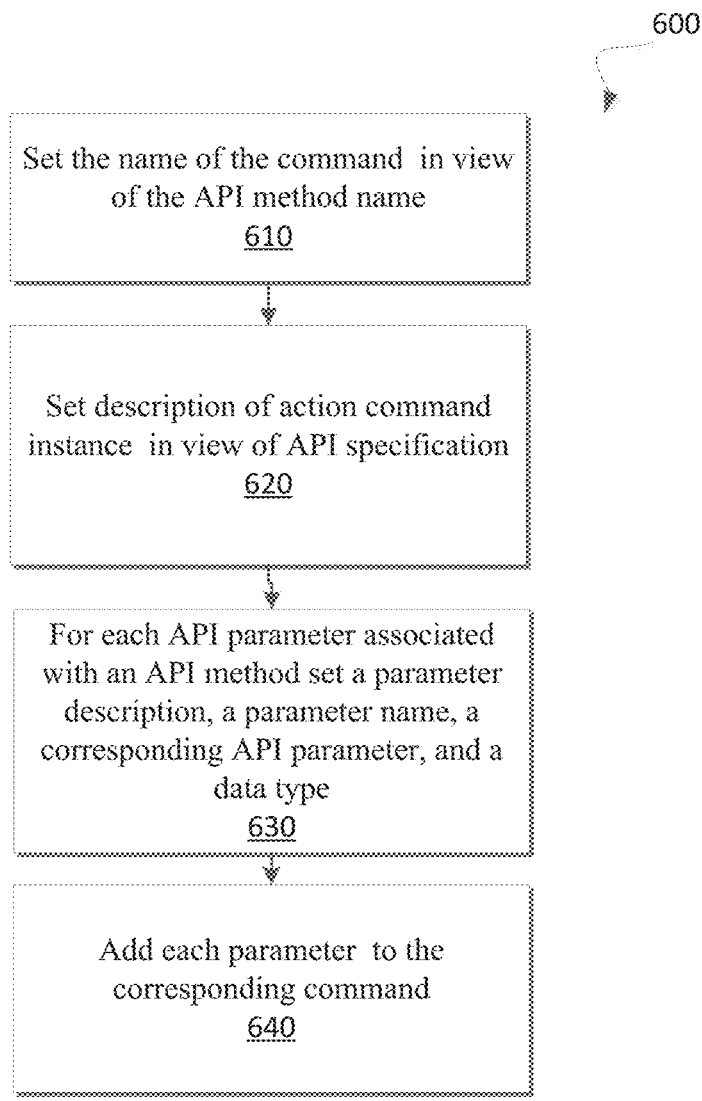
FIG. 6 is a flow diagram of an example method for creating a command definition in view of the API specification in accordance with some implementations.

FIG. 6 is a flow diagram of an example method for creating a command definition in view of the API specification in accordance with some implementations. The method 600 may be performed by processing logic that may comprise hardware (e.g., processing device, circuitry, dedicated logic, programmable logic, microcode, etc.), software (e.g., instructions run or executed on a processing device), or a combination thereof. The method 600 may be performed by CLI generator module 135A of client system 130.

Method 600 may begin at block 610 where processing logic executing the method may set the name of the action command in view of the name of the API method provided by the API specification. Method 600 may continue to block 620 where processing logic may set the description of the command to the description provided in the API specification. Method 600 may continue to block 630 where processing logic may for each API parameter associated with an API method as defined by the API specification, set the parameter name to correspond to the name of the API parameter, set the parameter description to the description provided by the API specification, map the parameter to corresponding API parameter, and set the data type of the parameter to the data type provided by the API specification. Method 600 may continue to block 640 where processing logic may add each parameter to the corresponding command. Method 600 is further described in reference to FIG. 1.

Figure 7:
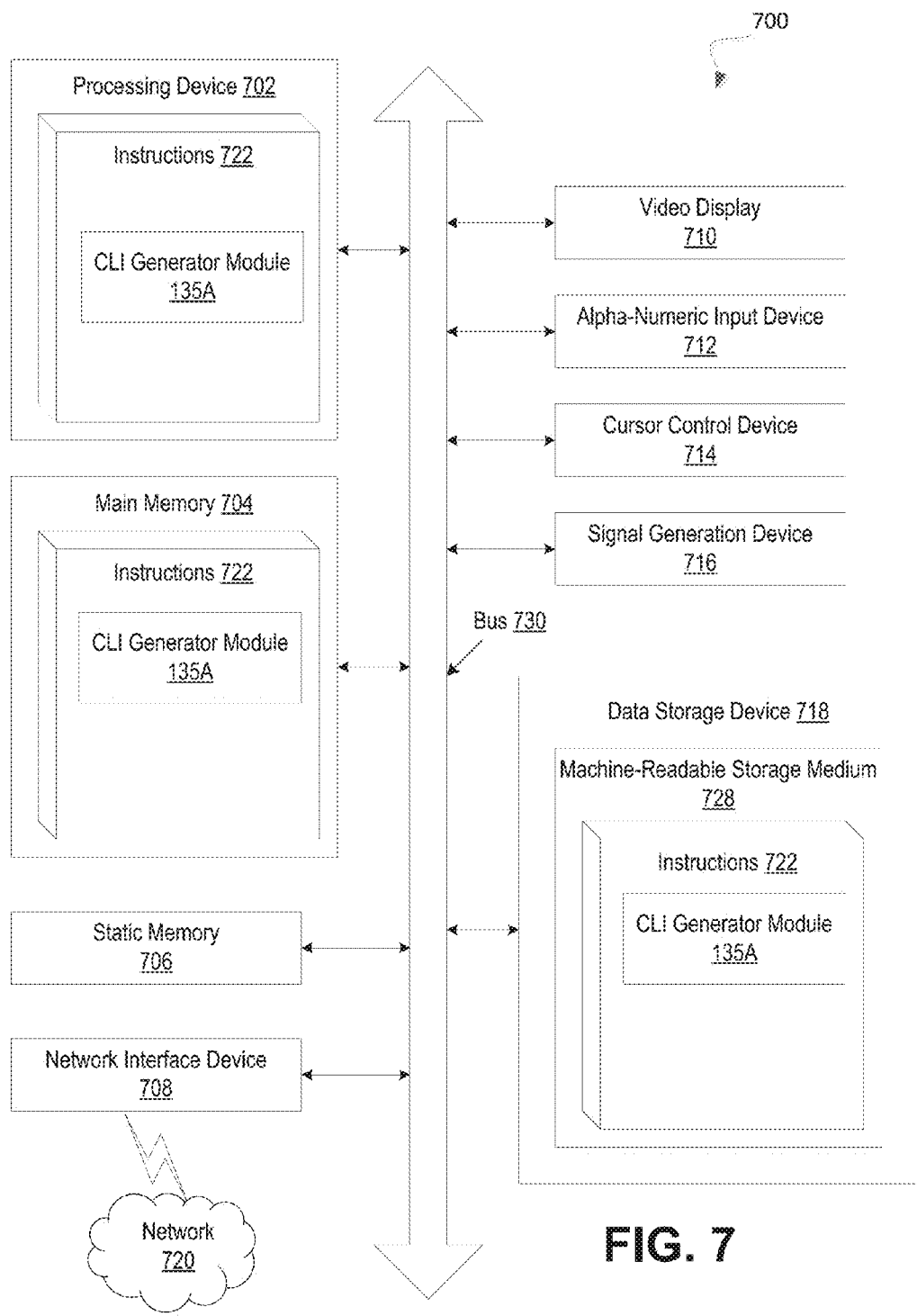
FIG. 7 illustrates a block diagram of a computer system in which some implementations of the disclosure may operate.

FIG. 7 illustrates a block diagram of a computer system (e.g., client system 130, client system 131, server system 110, and/or server system 112) in which some implementations of the disclosure may operate. In alternative implementations, the computer system 700 may be connected (e.g., networked) to other computer systems via a network 720, such as in a LAN, an intranet, an extranet, and/or the Internet. The computer system 700 may operate in the capacity of a server machine or a client machine in client-server network environment, as a peer machine in a peer-to-peer (or distributed) network environment, or as a server or a client machine in a cloud computing infrastructure or environment.

The computer system 700 may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single computer system is illustrated, the term "computer system" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations, methods, and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a CLI generator module (e.g., CLI generator module 135A and/or 135B of FIG. 1) and/or CLI 133A and/or CLI 133B of FIG. 1, and/or a software library containing methods that call CLI generator module 135A and/or 135B. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "defining" or "initializing" or "parsing" or "causing" or "sending" or "creating" or "linking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device of a client system, a request to initialize an instance of a command line interface (CLI) installed on the client system;
responsive to the request to initialize the instance of the CLI:
requesting, by a CLI generator module executed by the processing device, an application programming interface (API) specification for a software application installed on a server system;
receiving, by the CLI generator module, the API specification for the software application installed on the server system;
parsing, by the CLI generator module, the API specification to identify one or more API methods associated with an API resource of the API specification;
creating, by the CLI generator module, a command definition of the CLI corresponding to each API method by generating a corresponding CLI script fragment of a CLI script to map a command to each API method and associated one or more API parameters; and
launching the instance of the CLI on the client system in view of the CLI script.

2. The method of claim 1, further comprising:
receiving a command instance at the command line interface; and
causing the software application to execute an API method of the one or more API methods associated with a command corresponding to the command instance.

3. The method of claim 1, wherein the API specification comprises a definition of the one or more API methods to be performed at the server system and the one or more API parameters associated with the API method.

4. The method of claim 1, wherein the API specification further comprises a definition of the API resource associated with the one or more API methods.

5. The method of claim 1, wherein the API specification comprises metadata specifying at least one of a message associated with the one or more API methods or a format for displaying data associated with the one or more API methods.

6. The method of claim 2, wherein causing the software application to execute the API method of the one or more API methods associated with the command corresponding to the command instance further comprises:
sending, to the server system, a request identifying the API method to be performed and specifying one or more API parameters associated with the API method;
receiving a response status code from the software application in response to the request; and
causing a message associated with the response status code for the API method to be displayed on the client system.

7. The method of claim 1, further comprising:
parsing the API specification to identify the API resource; and
creating a resource definition for the API resource by generating a first fragment of the CLI script.

8. The method of claim 1, wherein creating the command definition further comprises:
modifying the command definition by generating an additional fragment of the CLI script to supply the one or more API parameters to the server system.

9. The method of claim 1, wherein the API is represented by a representational state transfer (REST) API.

10. A client system comprising:
a memory; and
a processing device, operatively coupled with the memory, to:
receive a request to initialize an instance of a command line interface (CLI) installed on the client system;
responsive to the request to initialize the instance of the CLI:
request, by a CLI generator module executed by the processing device, an application programming interface (API) specification for a software application installed on a server system;
receive, by the CLI generator, the API specification for the software application installed on the server system;
parse, by the CLI generator module, the API specification to identify one or more API methods associated with an API resource of the API specification;
create, by the CLI generator module, a command definition of the CLI corresponding to each API method by generating a corresponding CLI script fragment of a CLI script to map a command to each API method and associated one or more API parameters; and
launch the instance of the CLI on the client system in view of the CLI script.

11. The system of claim 10, wherein the processing device is further to:
receive a command instance at the command line interface; and
cause the software application to execute an API method of the one or more API methods associated with a command corresponding to the command instance.

12. The system of claim 10, wherein the API specification comprises a definition of the one or more API methods to be performed at the server system and the one or more API parameters associated with the API method.

13. The system of claim 11, wherein to cause the software application to execute the API method of the one or more API methods associated with the command corresponding to the command instance, the processing device further to:
send a request to the server system identifying the API method to be performed and specifying one or more API parameters associated with the API method;
receive a response status code from the software application in response to the request; and
cause a message associated with the response status code for the API method to be displayed on the client system.

14. The system of claim 10, the processing device further to:
parse the API specification to identify the API resource;
create a resource definition for the API resource by generating a first fragment of the CLI script; and modifying the command definition by generating an additional fragment of the CLI script to supply the one or more API parameters to the server system.

15. A non-transitory machine-readable storage medium including instructions that, when executed by a processing device, cause the processing device to:
receive, by the processing device of a client system, a request to initialize an instance of a command line interface (CLI) installed on the client system;
responsive to the request to initialize the instance of the CLI:
request, by a CLI generator module executed by the processing device, an application programming interface (API) specification for a software application installed on a server system;
receive, by the CLI generator module, the API specification for the software application installed on the server system;
parse, by the CLI generator module, the API specification to identify one or more methods associated with an API resource of the API specification;
create, by the CLI generator module, a command definition of the CLI corresponding to each API method by generating a corresponding CLI script fragment of a CLI script to map a command to each API method and associated one or more API parameters; and
launch the instance of the CLI on the client system in view of the CLI script.

16. The non-transitory machine-readable storage medium of claim 15, wherein the processing device is further to:
receive a command instance at the command line interface; and
cause the software application to execute an API method of the one or more API methods associated with a command corresponding to the command instance.

17. The non-transitory machine-readable storage medium of claim 16, wherein to cause the software application to execute the API method of the one or more API methods associated with the command corresponding to the command instance, the processing device further to:
send a request to the server system identifying the API method to be performed and specifying one or more API parameters associated with the API method;
receive a response status code from the software application in response to the request; and
cause a message associated with response code for the API method to be displayed on the client system.

18. The non-transitory machine-readable storage medium of claim 15, the processing device further to:
parse the API specification to identify the API resource; and
create a resource definition for the API resource by generating a first fragment of the CLI script.

19. The non-transitory machine-readable storage medium of claim 16, wherein to create the command definition, the processing device further to:
modify the command definition by generating an additional fragment of the CLI script to supply the one or more API parameters to the server system.

* * * * *